UNITED STATES PATENT OFFICE.

EDWARD PETTERSON HALS, OF NEW YORK, N. Y.

METHOD OF PRESERVING MILK AND CREAM.

SPECIFICATION forming part of Letters Patent No. 564,069, dated July 14, 1896.

Application filed March 15, 1895. Serial No. 541,922. (No specimens.)

*To all whom it may concern:*

Be it known that I, EDWARD PETTERSON HALS, of New York city, in the county and State of New York, have invented a new and Improved Method for Preserving Milk, Cream, &c., of which the following is a full, clear, and exact description.

The object of the invention is to provide a new and improved method for preserving milk, cream, and similar liquids in such a manner as to destroy all germs and other injurious matter contained in the liquid, and at the same time render it handy for transportation and for the market.

The method consists in first pasteurizing or sterilizing the liquid, then rapidly cooling it, and finally freezing it into blocks.

In order to carry this method into effect, I first pasteurize or sterilize the fresh milk or cream or mixture of both, in bulk and at about 75° centigrade, and then immediately and quickly cool it to about 10° centigrade. The thus-prepared liquid is now filled into tin or other metal boxes or barrels or other vessels of desirable shape and cubic contents. The filled vessels are then subjected to a low temperature by placing them in a freezing-house, refrigerator, or other device or machine to freeze the liquid solid in the vessel to form compact blocks of frozen milk or cream. The size of the vessels is preferably such as to produce blocks of milk or cream weighing, say, one-fourth, one-half, one, two, five pounds, up to any desired amount in pounds or other weight. The blocks of frozen milk or cream are then removed from the said vessels and packed into boxes or barrels of wood or metal, hermetically sealed, if desired, and then shipped in refrigerators to the market.

Cream or milk treated by this method can be transported to warm climates without danger of injury and without losing any of its valuable qualities. By the pasteurizing or sterilizing process harmful germs are destroyed.

It is important in practicing my invention that the heating be not carried above a certain degree, sufficient for pasteurization, but below the boiling-point. If the heating be carried to boiling-point, the milk will be given the peculiar taste of boiled milk, which is very objectionable to many, if not most people, changing the taste from that of fresh milk and decreasing the marketable value of the product. Moreover, if the milk is boiled its constipating effect is increased to such an extent as to render its use for general drinking purposes very objectionable. By my invention I raise the milk to a point where the vitality of the ferment is destroyed, and yet not to such a point as to objectionably affect the milk in the manner before stated.

By quickly cooling and freezing the milk after the pasteurization I avoid any pollution of the milk between the pasteurization and freezing thereof and thereby produce a pure unadulterated product.

Having thus described my invention, I claim as new and desire to secure by Letters Patent—

1. The herein-described method for preserving milk, cream, &c., which consists in first pasteurizing or sterilizing the liquid by heating the same to a temperature below that of boiling-point, then cooling it and finally freezing it into blocks substantially as described.

2. The herein-described method of preserving milk, cream, &c., which consists in first pasteurizing or sterilizing the liquid by heating the same, then cooling it, freezing it in suitable vessels, removing the frozen blocks and packing the same into suitable refrigerating containers, substantially as set forth.

3. The method of preserving milk or cream which consists in first heating it to a temperature less than boiling to sterilize the same, then cooling it and freezing to reduce a part or the whole to the solid form.

4. The method of preserving milk or cream which consists in first heating to a degree sufficient to sterilize the same, then cooling and freezing to reduce a part or the whole to the solid form and finally packing the refrigerated milk or cream in suitable holders.

EDWARD PETTERSON HALS.

Witnesses:
CHARLES J. C. SCHRODER,
CHESTER MOORE.